Oct. 11, 1949.        S. TOORANS        2,484,360

SAFETY TURNBUCKLE

Filed April 22, 1948

Samuel Toorans
INVENTOR.

BY *Thomas A. O'Brien*
and *Harvey B. Jackson*
Attorneys

Patented Oct. 11, 1949

2,484,360

UNITED STATES PATENT OFFICE 2,484,360

SAFETY TURNBUCKLE

Samuel Toorans, Upper Darby, Pa., assignor of ninety-five per cent to Milton Toorans, Lansdowne, Pa.

Application April 22, 1948, Serial No. 22,670

1 Claim. (Cl. 287—60)

This invention relates to improvements in safety devices for turnbuckles and is especially designed to be used in aircraft to insure the safe retention of a turnbuckle therein and is of particular value in confined quarters where use of conventional safety wire would be uncertain and tedious to install.

The primary object of the invention is to provide a safety device that can be used to retain turnbuckles thereon in fixed position, allowing for adjustment thereof and is to be used particularly in confined areas.

Features of the invention reside in the pin means for retaining the turnbuckle thereon, the three-tongue construction of the device for adjustment according to the length of the turnbuckle thereon and in the spring means for firmly securing a turnbuckle.

With the above and other objects and features in view which will more fully appear, the nature of the invention will more clearly be understood by the description and claim, as well as the figure illustrated in the accompanying drawings, wherein:

Figure 1:
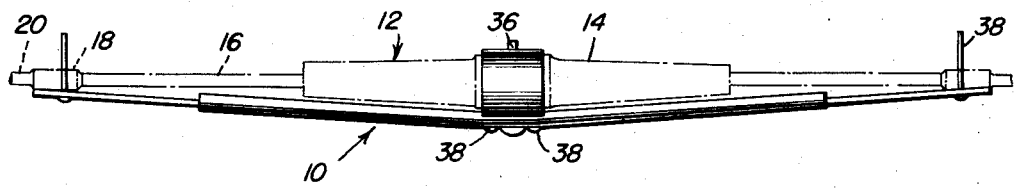
Figure 1 is a side elevation of the device of the invention with a turnbuckle illustrated therein in dotted lines.
Figure 2:
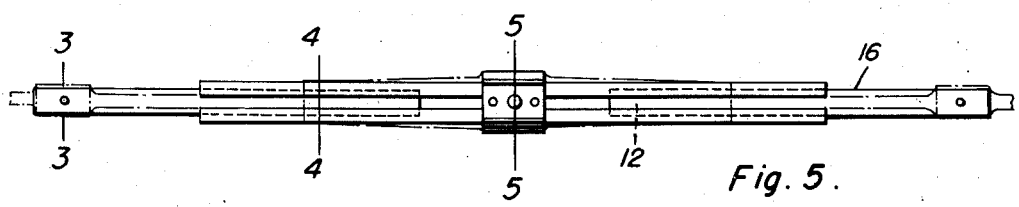
Figure 2 is a top plan view of the device seen in Figure 1.
Figure 3:
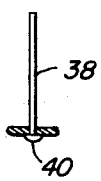
Figures 3, 4 and 5 are vertical transverse sectional views taken on lines 3—3, 4—4, 5—5 respectively in Figure 2.
Figure 4:
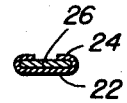
Figure 5:
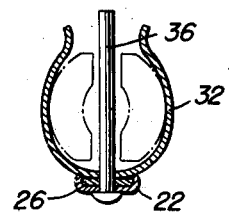

Referring to the figures, and particularly Figures 1 and 2, the safety device of the invention is indicated generally by the numeral 10 and retains a turnbuckle 12 therein, as illustrated in shadow, of the type used in the aircraft industry today. Turnbuckle 12 consists of a barrel center section 14 apertured medially for seating on safety device 10 as will presently appear and turnbuckle 12 includes lateral arms or stem ends 16 terminating in apertured eyes 18 of hexagonal shape and including swaged terminals 20.

Safety means 10 consists of three separate sections and includes a central strap 22 peened laterally at each edge thereof at 24 to provide means for retaining a pair of flat bars 26 in slidably adjustable relation within the space 28 formed by the peened edges 24. Strap 22 is bent at a slight angle and includes a central depression 30 in which a spring clip 32 is retained. Clip 32 is of arcuate U-shape and terminates in laterally extending flanges 34 to permit sliding engagement with turnbuckle barrel 14. Strap 22 is apertured in the bottom thereof in the depressed section 30. These apertures are three in number, the center one including a vertical center pin 36 riveted in the bottom and retaining spring clips 32 thereon. Spring 32 is also apertured on either side of center pin 36 and is welded or riveted to strap 22 to assure retention thereon. It is to be noted that depression 30 forms a flat seat for clip 32 and thereby additionally assures against displacement thereof.

Figure 6:
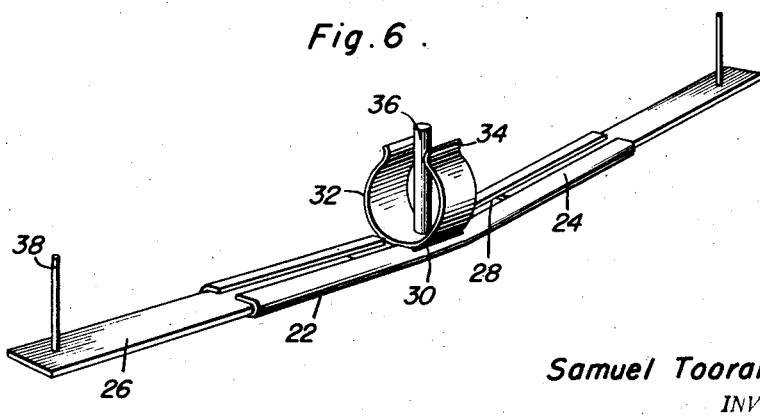
Figure 6 is a perspective view of the device of the invention.

Bars 26 are freely slidable in strap 22, and include vertical rods or pins 38 riveted at each extremity at 40 on said bars. These pins and the spring clip face in the same direction, as clearly illustrated in Figure 6, and assist in retaining a turnbuckle 12 thereon, pins 38 providing the adjustable retaining means when bars 26 are slid laterally in accordance with the size of the turnbuckle.

A turnbuckle 12 suitably apertured in the barrel section thereof is slid into position on center pin 36, flanges 34 serving to act as guides, spring clip 32 moving outwardly to receive the turnbuckle and then snapping back into closed position. Pins 38 engage the apertured extremities of the turnbuckle and are adjustable for the various sizes of turnbuckles used. By varying the size of spring clip 32, this device can also be made to fit various special turnbuckles of odd sizes. The "snap on" feature of the device allows perfect adjustment and safety without skilled labor. Obviously, it allows repeated removal and replacement. Clip 32 is made of spring steel preferably, and is drilled for the aperture before heat treatment to slidably seat over center pin 36 in the depression 30.

While this specification sets forth in detail the present and preferred construction of the device, it is to be understood that deviations may be resorted to as do not form a departure from the spirit of the invention, as defined by the appended claim.

Having described the invention what is claimed as new is:

A turnbuckle safety device consisting of a bent strap, said strap including peened edges to form a slideway, a pair of flat bars received in said strap, a depression in the center of said strap, a pin and a spring clip secured to said strap centrally thereof and pins mounted at the extremities of each bar, all of said pins and said clip retaining a turnbuckle therein.

SAMUEL TOORANS.

REFERENCES CITED

The following references are of record in the file of this patent:

UNITED STATES PATENTS

| Number | Name | Date |
|---|---|---|
| 1,877,370 | Streit | Sept. 13, 1932 |
| 2,395,546 | Harrington | Feb. 26, 1946 |

FOREIGN PATENTS

| Number | Country | Date |
|---|---|---|
| 183,483 | Canada | 1918 |
| 108,605 | Great Britain | 1917 |